July 6, 1948.                C. P. DEIBEL                2,444,872
            SEALED DRY CELL WITH THREADED END
                    Filed March 14, 1945
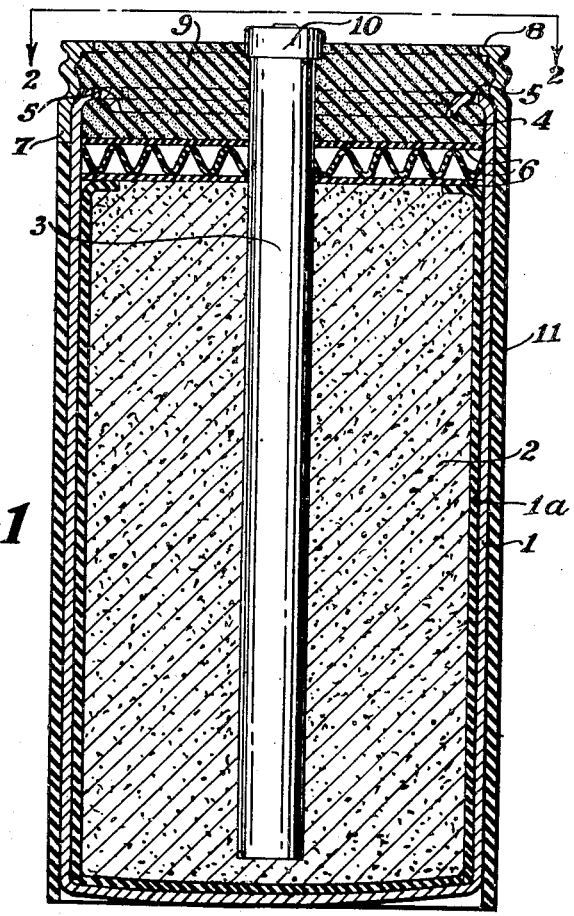
Fig.1
Fig.2
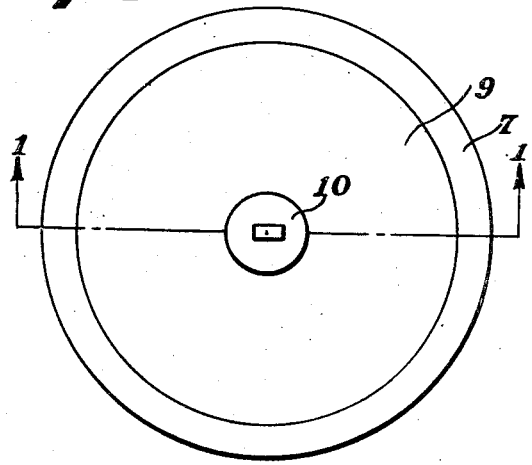
CYRIL P. DEIBEL, INVENTOR DECEASED.
MARION T. DEIBEL.
THE CLEVELAND TRUST COMPANY.
BY EDWARD B. ROBERTS,
              TRUST OFFICER,
CO-EXECUTORS.
BY Fay, Golrick & Chilton.
            Attorneys.

Patented July 6, 1948

2,444,872

UNITED STATES PATENT OFFICE 2,444,872

SEALED DRY CELL WITH THREADED END

Cyril P. Deibel, deceased, late of Lakewood, Ohio, by Marion T. Deibel, Lakewood, and The Cleveland Trust Company, Cleveland, Ohio, co-executors, assignors to General Dry Batteries, Inc., a corporation of Ohio Application March 14, 1945, Serial No. 582,600

5 Claims. (Cl. 136—133)

1

This invention relates to a dry cell the upper end of which is exteriorly threaded so that the cell may be threadedly secured within a socket or fixture such as in a flashlight case, the terminals being exposed so as to contact corresponding terminals or contacts.

One of the objects of the invention is to provide a dry cell of the character described which is simple in construction and well adapted for quantity production at comparatively low cost.

Another object of the invention is to provide a dry cell having the above described distinguishing features and characteristics and in which the likelihood of leakage is reduced to a minimum and which is effectively sealed against either the ingress or egress of moisture.

Another object of the invention is to provide a dry cell of the character described which has secured to the upper end thereof a metal ferrule which is exteriorly threaded and adapted to engage a threaded socket or opening, the cell being effectively sealed by a seal which interlocks with the negative electrode or zinc cup and the metal ferrule.

A further object of the invention is to provide a dry cell of the character described which consists essentially of a zinc container which contains a mass of mix and a carbon electrode and which has secured thereto adjacent the upper end thereof a threaded metal ferrule which has contact with the zinc cup, the zinc cup having its upper edge turned over inwardly and embedded within a layer of sealing material, the layer of sealing material serving to close the zinc cup and to interlock with the metal ferrule.

Further and more limited objects of the invention will appear as the description proceeds and by reference to the accompanying drawings in which Fig. 1 is a vertical sectional view on the line 1—1 of Fig. 2; and Fig. 2 is a top plan view taken on the line 2—2 of Fig. 1.

Referring now to the drawings, the dry cell preferably comprises a zinc cup 1 which contains a mass of mix 2 and a carbon electrode 3. The mass of mix is insulated from the zinc cup by a lining of battery paper 1a, as shown in Fig. 1. The upper peripheral edge of the zinc cup is turned over inwardly as indicated at 4 and the turned over portion is provided with a plurality of vents indicated by the reference character 5. Disposed over the mass of mix is a washer 6 preferably formed of corrugated board or paper which serves to provide a gas expansion chamber. Rigidly secured over the upper end of the cell, preferably by being press fitted thereover, is a

2 metal ferrule 7, the upper end of which is threaded, the threads being preferably rolled therein, thus providing both internal and external threads as shown in the drawing. The upper peripheral edge of the metal ferrule is bent over inwardly as indicated by the reference character 8. The cell is closed by a layer of suitable sealing material 9 which embraces the curled upper edge of the zinc cup and completely fills the ferrule. The carbon electrode 3 extends through this layer of sealing material and is provided with a metal cap 10 which, if desired, may have a vent therein, although in some cases it is desirable to omit the vent. It will be seen that the layer of sealing material embraces the inturned upper end of the zinc cup and the threaded portion of the metal ferrule so as to provide an effective seal for the cell. The seal is preferably made of wax or pitch and is poured while hot. The vents 5 prevent air being trapped under the inturned peripheral edge of the zinc cup. The zinc cup is enclosed within an outer insulating casing or jacket 11 which abuts the ferrule at its upper end. The bottom of the zinc cup is left exposed when the cell is used in the usual flashlight case. The cell is also adapted to threadedly receive thereover the threaded head of a flashlight or it may be screwed into a specially designed fixture.

It is of course to be understood that the cell may be made of any desired shape and size depending upon the capacity desired.

Various changes may be made in the details of construction as well as in the size and thickness of the several parts without departing from the spirit of the invention. The embodiment of the invention herein disclosed is to be considered merely as illustrative and not in a limiting sense, as the invention is limited only in accordance with the scope of the appended claims. It will now be clear that there has been provided a dry cell which will accomplish the objects of the invention as hereinbefore stated.

Having thus described the invention, what is claimed is:

1. A dry cell comprising a metal container containing a mass of depolarizing mix and a carbon electrode, the upper edge of said container being turned inwardly, a mass of sealing material closing said container and enveloping the inturned end of the same, and an exteriorly threaded metal ferrule tightly embracing the upper end of said container and extending above the top thereof, said mass of sealing material also sealing against the interior surface of said ferrule.

2. A dry cell comprising a metal container containing a mass of depolarizing mix and a carbon electrode, the upper edge of said container being turned inwardly, a mass of sealing material closing said container and enveloping the inturned end of the same, and an exteriorly threaded metal ferrule tightly embracing the upper end of said container and extending above the top thereof, said ferrule having its upper edge turned inwardly and embraced by said mass of sealing material.

3. A dry cell comprising a zinc container containing a mass of depolarizing mix and a carbon electrode, an externally threaded metal ferrule secured to the upper end of said zinc container and projecting thereabove, and a mass of sealing material in sealing engagement with the upper end of said container, said metal ferrule being exteriorly threaded and having inwardly projecting portions thereon embraced by said mass of sealing material.

4. A dry cell comprising a zinc container containing a mass of depolarizing mix and a carbon electrode, an externally and internally threaded metal ferrule secured to the upper end of said zinc container and projecting thereabove, and a layer of sealing material closing the upper end of said cell, said sealing material engaging the inner surface of the upper end of said container and engaging with and conforming to the internal threads on said ferrule and said container whereby said sealing material interlocks said container and said ferrule, said carbon electrode having a terminal cap thereon disposed in substantially the same horizontal plane as the top of said ferrule.

5. A dry cell comprising a zinc container containing a mass of depolarizing mix and a carbon electrode, an externally and internally threaded metal ferrule secured to the exterior of the upper end of said zinc container and projecting thereabove, and a closure closing the upper end of said cell, said closure comprising a mass of sealing material engaging the upper end of said zinc container and engaging with and conforming to the internally threaded surface of said ferrule and thereby interlocking said container and said ferrule.

MARION T. DEIBEL,
THE CLEVELAND TRUST COMPANY,
By EDWARD B. ROBERTS,
Trust Officer,
Coexecutors Under the Will of Cyril P. Deibel, Deceased.

REFERENCES CITED

The following references are of record in the file of this patent:

UNITED STATES PATENTS

| Number | Name | Date |
| --- | --- | --- |
| Re. 15,846 | French | May 27, 1924 |
| 924,575 | Patterson | June 8, 1909 |
| 1,251,005 | French | Dec. 25, 1917 |
| 1,490,455 | Combs | Apr. 15, 1924 |
| 1,549,851 | Benner | Aug. 18, 1925 |
| 2,079,495 | Deibel | May 4, 1937 |